United States Patent
Ko et al.

(10) Patent No.: US 8,401,052 B2
(45) Date of Patent: Mar. 19, 2013

(54) METHOD FOR DETECTING SIGNALS BASED ON DESPREADING AND METHOD FOR TRANSMITTING SIGNALS FOR THE SAME

(75) Inventors: Hyun Soo Ko, Gyeonggi-do (KR); Bin Chul Ihm, Gyeonggi-do (KR); Jin Young Chun, Gyeonggi-do (KR); Wook Bong Lee, Gyeonggi-do (KR); Moon Il Lee, Gyeonggi-do (KR); Jae Wan Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 824 days.

(21) Appl. No.: 12/526,492

(22) PCT Filed: Feb. 11, 2008

(86) PCT No.: PCT/KR2008/000778
§ 371 (c)(1),
(2), (4) Date: Aug. 7, 2009

(87) PCT Pub. No.: WO2008/097058
PCT Pub. Date: Aug. 14, 2008

(65) Prior Publication Data
US 2010/0316093 A1    Dec. 16, 2010

Related U.S. Application Data

(60) Provisional application No. 60/889,240, filed on Feb. 9, 2007.

(30) Foreign Application Priority Data

May 21, 2007 (KR) .......................... 10-2007-0049182

(51) Int. Cl.
*H04B 1/00* (2006.01)

(52) U.S. Cl. ........................................................ 375/141
(58) Field of Classification Search .................. 375/130, 375/140, 141, 144, 145, 146, 147, 148, 259, 375/260, 261, 262, 267, 258, 295, 296, 297, 375/299, 316, 340, 341, 346, 347, 354, 356; 455/39, 68, 69; 370/203, 208, 209, 210
See application file for complete search history.

(56) References Cited

U.S. PATENT DOCUMENTS

| | | | |
|---|---|---|---|
| 5,867,478 A * | 2/1999 | Baum et al. | 370/203 |
| 2003/0123530 A1 * | 7/2003 | Maeda et al. | 375/148 |
| 2004/0013094 A1 | 1/2004 | Tong et al. | |
| 2005/0185725 A1 * | 8/2005 | Maeda et al. | 375/260 |
| 2005/0201474 A1 * | 9/2005 | Cho et al. | 375/260 |
| 2007/0268988 A1 * | 11/2007 | Hedayat et al. | 375/347 |

FOREIGN PATENT DOCUMENTS

WO   2005004347   1/2005

* cited by examiner

*Primary Examiner* — David C. Payne
*Assistant Examiner* — Vineeta Panwalkar
(74) *Attorney, Agent, or Firm* — Lee, Hong, Degerman, Kang & Waimey

(57) ABSTRACT

A method for detecting signals based on despreading and a signal transmitting method for the same are provided. Signals are spread according to the size of at least one spreading band, which is determined in consideration of a correlation degree of a frequency band in a communication system. A reception side which receives the signals detects the signals after despreading with respect to signals which are spread in a frequency band having a correlation degree equal to or greater than a predetermined level as a spreading band, among the reception signals. Thus, the dimension of the detected signals can be decreased.

10 Claims, 6 Drawing Sheets

METHOD FOR DETECTING SIGNALS BASED ON DESPREADING AND METHOD FOR TRANSMITTING SIGNALS FOR THE SAME

CROSS-REFERENCE TO RELATED APPLICATIONS

This application is the National Stage filing under 35 U.S.C. 371 of International Application No. PCT/KR2008/000778, filed on Feb. 11, 2008, which claims the benefit of earlier filing date and right of priority to Korean Application No. 10-2007-0049182, filed on May 21, 2007, and also claims the benefit of U.S. Provisional Application Ser. No. 60/889,240, filed on Feb. 9, 2007.

TECHNICAL FIELD

The present invention relates to a method for detecting signals based on despreading and a signal transmitting method for the same.

BACKGROUND ART

General communication systems will be first described and, among such communication systems, problems which occur in a communication system using discrete Fourier transform (DFT) spreading will be then described.

First, an orthogonal frequency division multiplexing (OFDM) scheme may be combined with an access scheme such as a time division multiple access (TDMA) scheme, a code division multiple access (CDMA) scheme or a frequency division multiple access (FDMA) scheme, for the access of multiple users. Respective combinations of the OFDM scheme and access schemes have respective merits and demerits. Among them, when the FDMA scheme is applied, it is advantageous that flexibility in allocation of frequency resources and bandwidth efficiency of a system are excellent and an adaptive modulation/demodulation scheme according to channels is applicable. Thus, an OFDM-FDMA (hereinafter, referred to as "OFDMA") scheme is preferred.

Meanwhile, the OFDM scheme generally has merits that bandwidth efficiency is high and a single-tap channel compensation is possible and thus applies to high-speed data transmission. However, this scheme has problems which should be solved, such as a synchronization problem or a peak-to-average-power ratio (PAPR) problem.

Among various problems, the PAPR problem occurs because a maximum value of a range in which an amplifier of a terminal can linearly amplify a signal is restricted. In the OFDM scheme, since a plurality of carriers overlap one another, a relatively high PAPR occurs. If a maximum power value exceeds a linear range, a transmission signal is distorted and capability deteriorates.

Hereinafter, among various methods for suppressing the PAPR problem, a method for performing DFT spreading will be described.

FIG. 1 is a block diagram of a communication system for spreading and transmitting a transmission signal.

As shown in FIG. 1, the communication system using the spreading of the transmission signal encodes the transmission signal (111), modulates the transmission signal (112), and spreads the transmission signal in a predetermined frequency band (113). In a single carrier FDMA (SC-FDMA) scheme, the DFT spreading is used in the spreading. Thereafter, the spread signal is subjected to FDMA mapping (114), is subjected to OFDM modulation (115), and is converted into an analog signal by a digital-analog converter (DAC) 116. Thereafter, the signal is shifted to a predetermined frequency band by a local oscillator (LO) 117 and is transmitted through a power amplifier (PA) 118 and an antenna 119.

The transmitted signal is received through a channel 120, and is subjected to an inverse process of the process of the transmission side by a reception side. That is, the signal received by an antenna 131 is shifted to a baseband signal by an LO 132 and is converted into a digital signal by an analog-digital converter (ADC) 133. Thereafter, the signal is subjected to OFDM demodulation (134), is subjected to FDMA demapping (135), is equalized/detected (136), is demodulated (137), and is decoded (138).

The SC-FDMA scheme in which the DFT spreading is used in the spreading (113) of the spreading-based system will now be described.

The DFT spreading has a basic concept that, if signals are spread using the DFT having an opposite concept of the inverse fast Fourier transformation (IFFT), the PAPR problems related to overlapping of signals which are generated at the time of performing the IFFT in the OFDM modulation can be solved. Due to such a property, the DFT spreading scheme is also called the SC-FDM scheme. A combination of the SC-FDM scheme and the FDMA scheme is called SC-FDMA.

The DFT spreading concept will now be described in detail.

FIG. 2 is a view illustrating a concept of performing the DFT spreading.

In more detail, FIG. 2 shows a process of spreading input data rows x[0] to x[7] to respective subcarrier areas k and acquiring spread data rows X[0] to X[7] when the size of a DFT spreading band is 8 (N=8). A matrix for performing the DFT spreading and the IDFT which is an inverse process thereof is expressed as follows.

$$W = \frac{1}{\sqrt{N}} \begin{bmatrix} \omega^{0 \cdot 0} & \omega^{0 \cdot 1} & \cdots & \omega^{0 \cdot (n-1)} \\ \omega^{1 \cdot 0} & \omega^{1 \cdot 1} & \cdots & \omega^{1 \cdot (n-1)} \\ \vdots & \vdots & \ddots & \vdots \\ \omega^{(n-1) \cdot 0} & \omega^{(N-1) \cdot 1} & \cdots & \omega^{(n-1) \cdot (n-1)} \end{bmatrix}, \quad \text{Equation 1}$$

$$\text{where} \begin{cases} DFT: \omega = e^{-j\frac{2\pi}{N}} \\ IDFT: \omega = e^{j\frac{2\pi}{N}} \end{cases}$$

where, N denotes the size of data for performing the DFT and IDFT, W denotes a DFT matrix if $$\omega = e^{-j\frac{2\pi}{N}}$$

and W denotes an IDFT matrix if $$\omega = e^{j\frac{2\pi}{N}}.$$

In the spreading-based system, as described above, the PAPR problem can be efficiently solved, but complexity of the signal detection is increased because a reception signal should be detected in consideration of the spreading which is performed at the transmission side.

Particularly, if a virtual multiple input-multiple output (MIMO) technique is used in a communication system using multiple antennas, the dimension of signals is increased by the number of DFT-spread signals as well as the number of users and thus the complexity of the signal detection is further increased.

DISCLOSURE OF INVENTION

Accordingly, the present invention is directed to a method for detecting signals based on despreading and a signal transmitting method for the same that substantially obviate one or more problems due to limitations and disadvantages of the related art.

An object of the present invention devised to solve the problem lies on a method capable of easily detecting signals even in a spreading-based system and a signal transmitting method for the same.

The object of the present invention can be achieved by providing a method for detecting signals at a reception side in a communication system, the method including: receiving the signals which are spread by a transmission side, according to the size of at least one spreading band; and despreading the received signals, if the received signals are spread in a frequency band having a correlation degree equal to or greater than a predetermined level as the spreading band and detecting the despread signals.

At this time, the detecting the despread signals may include detecting the despread signals by a maximum likelihood (ML) detection method after the despreading.

Preferably, the method may further include detecting the received signals by a linear detection method if the received signals are spread in a frequency band having a correlation degree less than a predetermined level as the spreading band.

In addition, the size of the at least one spreading band may be determined at the reception side in consideration of the size of a coherence bandwidth for each frequency band. In this case, the method may further include transmitting information on the size of the at least one spreading band to the transmission side, before the receiving of the signals.

In addition, the size of the at least one spreading band may be determined in further consideration of at least one of maximum allowed power of a power amplifier or average power allocated to the transmission side.

The communication system may use any one of a single carrier frequency division multiple access (SC-FDMA) scheme and an orthogonal frequency division multiple access (OFDMA) scheme, and, if the communication system uses the OFDMA scheme, the size of the at least one spreading band may be determined and used by one subcarrier band. At this time, the method may further include transmitting information on the communication scheme used in the communication system to the transmission side.

In another aspect of the invention, there is provided a method for transmitting signals at a transmission side in a communication system, the method including: acquiring information on the size of at least one spreading band, which is determined in consideration of a correlation degree of a frequency band; and spreading transmission signals according to the size of the at least one spreading band and transmitting the spread signals.

At this time, the size of the at least one spreading band may be determined at a reception side in consideration of the size of a coherence bandwidth of the frequency band. The information on the size of the at least one spreading band may be received and acquired from a reception side.

The method may further include determining the level of modulation and coding scheme (MCS) according to a detection method used in a reception side. In this case, the transmission signals include information on the level of the MCS.

ADVANTAGEOUS EFFECTS

As described above, according to the embodiment of the present invention, signals can be easily detected through despreading even in a spreading-based system. The present invention may be efficiently embodied by various combinations of various communication schemes and various detection methods.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Hereinafter, preferred embodiments of the present invention will be described in detail with reference to the accompanying drawings. The present invention will become more fully understood from the detailed description provided herein below and the accompanying drawings which are given by way of illustration only, and thus do not limit the present invention.

The following detailed description includes details in order to provide complete understanding of the present invention. However, it will be apparent to those skilled in the art that the present invention can be embodied without the details. In some cases, known structures and devices are omitted in order to avoid ambiguity of the concept of the present invention or main functions of the structures and the devices are shown in a block diagram. The same reference numbers will be used throughout the drawings to refer to the same or like parts.

As described above, according to the present invention, a method capable of easily detecting signals even in a spreading-based system is provided. Hereinafter, in a case where a SC-FDMA scheme is used in the spreading-based system, a method for detecting signals at a reception side in a single input-single output (SISO) system or a virtual multiple input-multiple output (MIMO) system will be described.

Figure 1:
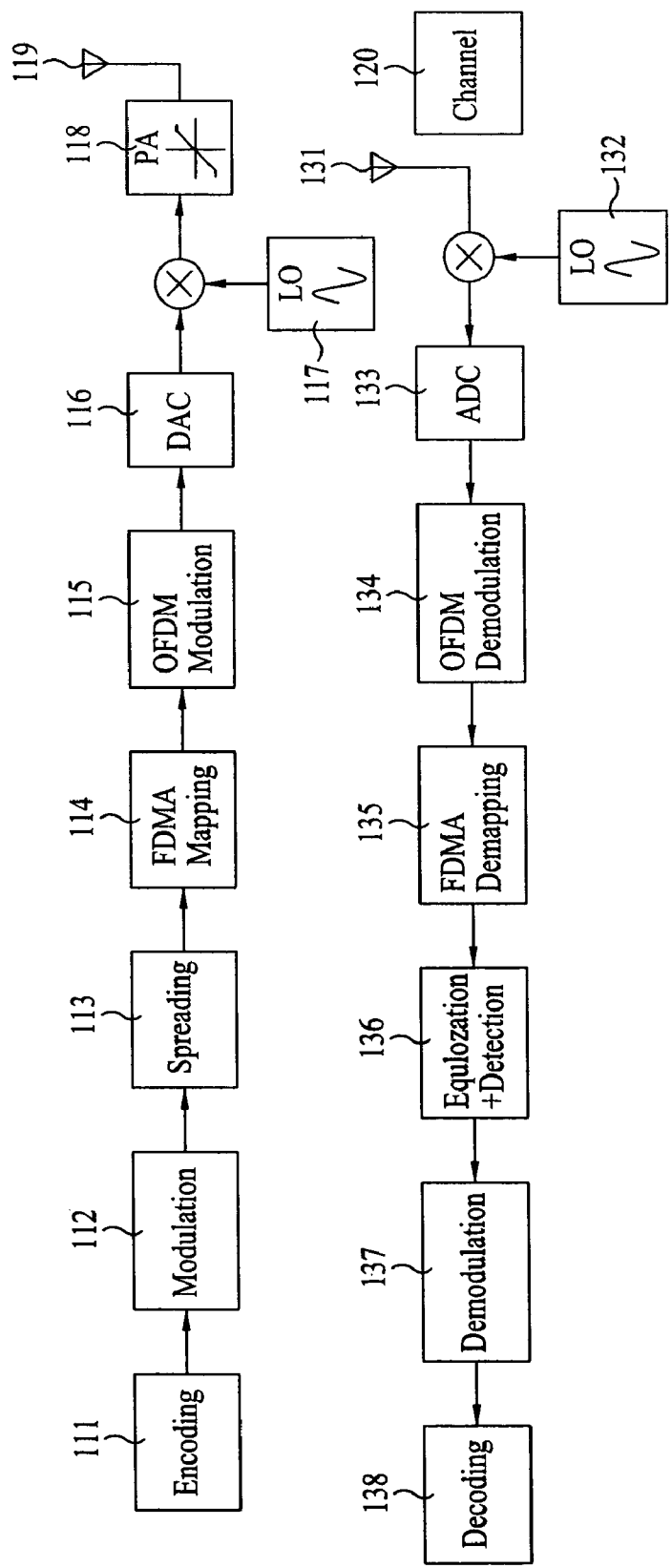
FIG. 1 is a block diagram of a communication system for spreading and transmitting a transmission signal.
Figure 2:
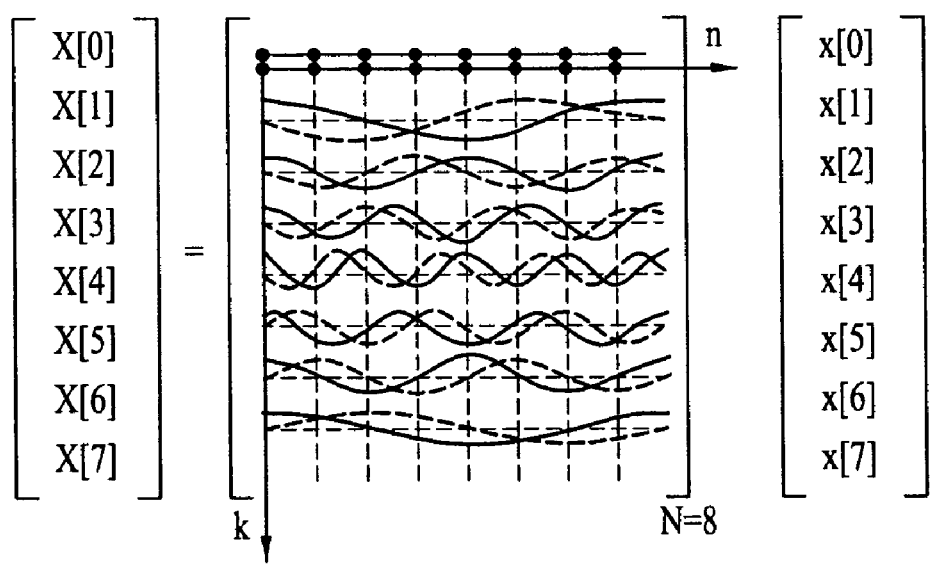
FIG. 2 is a view illustrating a concept of performing DFT spreading.
Figure 3:
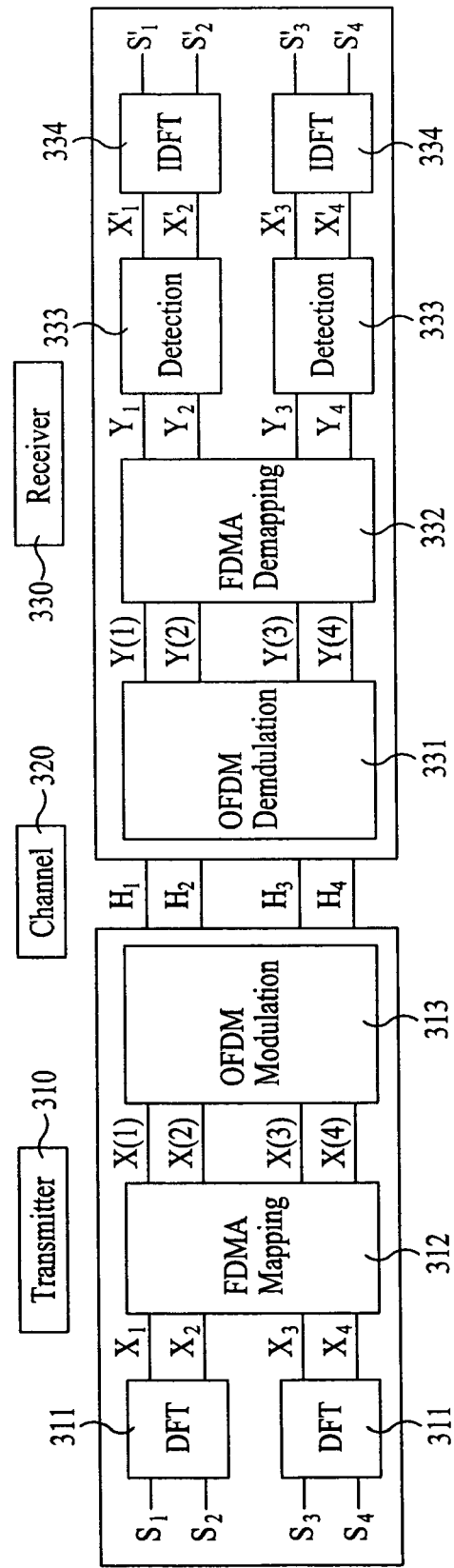
FIG. 3 is a view showing a case where a DFT size is set to 2 in a single input-single output (SISO) system.

FIG. 3 is a view showing a case where a DFT size is set to 2 in the SISO system.

As shown in FIG. 3, a transmission side 310 of the SISO-OFDM system performs DFT spreading (311) with respect to a data symbol having a DFT length among all data symbols, performs FDMA mapping (312) and OFDM modulation (313), and transmits the data symbol through a channel 320.

A reception signal vector Y received by a reception side through the above-described process is expressed as follows.

$$Y = HDS + N \quad \text{Equation 2}$$

$$\text{where, } Y = \begin{bmatrix} Y_1 \\ Y_2 \end{bmatrix}, H = \begin{bmatrix} H(1) & 0 \\ 0 & H(2) \end{bmatrix},$$

$$D = \begin{bmatrix} 1 & 1 \\ 1 & -1 \end{bmatrix}, S = \begin{bmatrix} S_1 \\ S_2 \end{bmatrix}, N = \begin{bmatrix} N(1) \\ N(2) \end{bmatrix}$$

where, a vector S denotes data symbols $S_1$ and $S_2$ input to an upper DFT spreading module of two DFT spreading modules 311 shown in FIG. 3, D denotes a DFT matrix, and N denotes noise. In addition, H denotes a diagonal matrix of channel responses in a transmission process after the data vector S is subjected to DFT spreading.

Meanwhile, a reception side 330 performs OFDM demodulation (331) and FDMA demapping 332 with respect to a reception signal and detects a transmission data signal from the reception signal through a detection module 333, as shown in FIG. 3. At this time, if a zero-forcing (ZF) or minimum mean square error (MMSE) linear detector is used, the data symbol can be detected through despreading 334 after performing channel compensation as follows.

$$\tilde{S} = D'WY = D'WHDS + D'WN \quad \text{Equation 3}$$

$$\text{where, } \begin{cases} ZF: & W = H^{-1} \\ MMSE: & W = \dfrac{H^H}{HH^H + \sigma^2 I} \end{cases}$$

where, D' denotes an IDFT matrix.

In addition, in a case where the data symbol is detected using a maximum likelihood (ML) method as a non-linear detection method, the signal can be detected using the reception signal before despreading as follows.

$$\tilde{S}_{ML} = \underset{\tilde{S}}{\arg\min} Diff^2, \text{ where } Diff = Y - H_{est}D\tilde{S} \quad \text{Equation 4}$$

A case where the SC-FDMA scheme is used in the virtual MIMO system will now be described.

Figure 4:
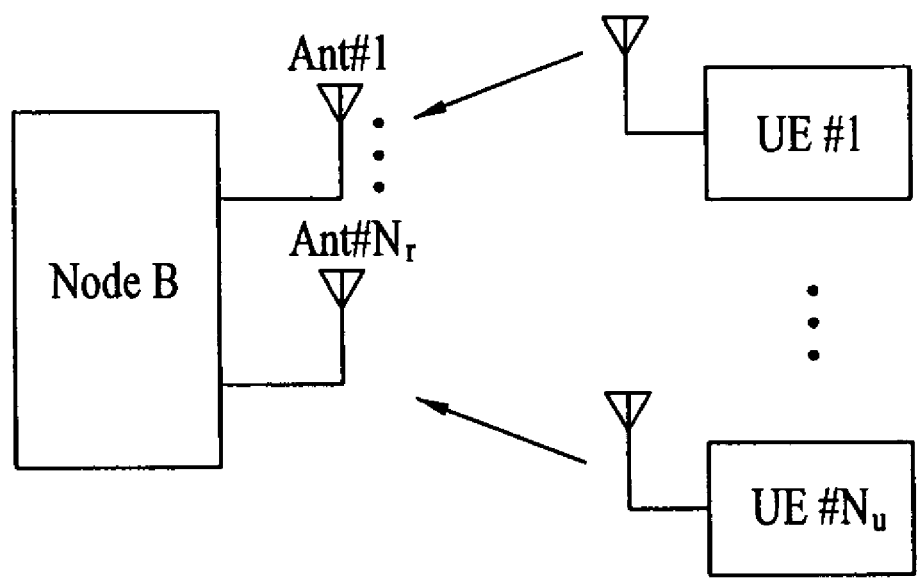
FIG. 4 is a view illustrating a transmission concept in a virtual multiple input-multiple output (MIMO) system.

FIG. 4 is a view illustrating a transmission concept in the virtual MIMO system.

In more detail, FIG. 4 shows a concept in which a base station (or a node B) having $N_r$ antennas receives signals from $N_u$ user equipments (UEs). In this case, the base station may divide received $N_r$ streams.

In the system shown in FIG. 4, if each of the UEs transmits only one stream without DFT spreading in an uplink, the base station can detect the $N_r$ UE signals using the linear detection method (for example, the ZF or MMSE method) or the non-linear detection method (for example, the ML method). In other words, if the UEs transmit the signals by the OFDMA scheme, the base station can detect the signals by a scheme similar to a spatial multiplexing (SM) scheme.

However, if the SC-FDMA is used in the system shown in FIG. 4, the base station should detect the signals in consideration of the effect on the DFT spreading. With respect to the system in which the number of UEs for performing DFT spreading in units of $N_s$ subcarriers and transmitting signals is $N_u$ and the base station receives the signals through the $N_r$ antennas, the reception signals can be modeled as follows.

$$Y = HDS + N = HX + N \quad \text{Equation 5}$$

$$\begin{bmatrix} Y_1 \\ \vdots \\ Y_{N_r} \end{bmatrix} = \begin{bmatrix} H_{11} & \cdots & H_{1N_u} \\ \vdots & \ddots & \vdots \\ H_{N_r1} & \cdots & H_{N_rN_u} \end{bmatrix} \begin{bmatrix} D_F & \cdots & 0 \\ \vdots & \ddots & \vdots \\ 0 & \cdots & D_F \end{bmatrix} \begin{bmatrix} S_1 \\ \vdots \\ S_{N_u} \end{bmatrix} + \begin{bmatrix} N_1 \\ \vdots \\ N_{N_r} \end{bmatrix}$$

$$= \begin{bmatrix} H_{11} & \cdots & H_{1N_u} \\ \vdots & \ddots & \vdots \\ H_{N_r1} & \cdots & H_{N_rN_u} \end{bmatrix} \begin{bmatrix} X_1 \\ \vdots \\ X_{N_u} \end{bmatrix} + \begin{bmatrix} N_1 \\ \vdots \\ N_{N_r} \end{bmatrix}$$

where, a vector X denotes the result obtained by spreading the transmission signal vector S by the DFT matrix D.

In more detail, in Equation 5, a reception signal vector Y includes reception signal vectors $Y_1$ to $Y_{N_r}$. Each reception signal vector can be expressed by as follows.

$$Y_r = \begin{bmatrix} Y_r(1) \\ \vdots \\ Y_r(N_s) \end{bmatrix} \quad \text{Equation 6}$$

where, $Y_r(s)$ denotes a signal which is received by a $r^{th}$ antenna of the base station through a $s^{th}$ subcarrier.

In addition, in Equation 5, a channel response includes a channel response vector experienced when the signals from the $N_u$ UEs are received through the $N_r$ reception antennas. Each channel response vector can be expressed as follows.

$$H_{ru} = \begin{bmatrix} H_{ru}(1) & \cdots & 0 \\ \vdots & \ddots & \vdots \\ 0 & \cdots & H_{ru}(N_s) \end{bmatrix} \quad \text{Equation 7}$$

where, $H_{ru}(s)$ denotes a channel response experienced when a transmission signal transmitted from a $u^{th}$ UE through the $s^{th}$ subcarrier is received by the $r^{th}$ antenna.

In addition, in Equation 5, the transmission signal S includes transmission signal vectors from the $N_u$ UEs. Each transmission signal vector can be expressed as follows.

$$S_u = \begin{bmatrix} S_u(1) \\ \vdots \\ S_u(N_s) \end{bmatrix} \quad \text{Equation 8}$$

where, $S_u(s)$ denotes a transmission signal which is transmitted from the $u^{th}$ UE through the $s^{th}$ subcarrier.

In addition, $D_F$ of Equation 5 denotes a DFT matrix of $N_s*N_s$ and N denotes additive white Gaussian noise (AWGN) of each antenna of the base station.

If the channel response and the DFT matrix are combined to one in Equation 5, the following equation is obtained.

$$Y = \hat{H}S + N \quad \text{Equation 9}$$

where, $$\hat{H} = \begin{bmatrix} \hat{H}_{11} & \cdots & \hat{H}_{1N_u} \\ \vdots & \ddots & \vdots \\ \hat{H}_{N_r1} & \cdots & \hat{H}_{N_rN_u} \end{bmatrix}, \hat{H}_{ru} = H_{ru}D_F,$$

$$H_{ru} = \begin{bmatrix} H_{ru}(1) & \cdots & 0 \\ \vdots & \ddots & \vdots \\ 0 & \cdots & H_{ru}(N_s) \end{bmatrix}$$

Among the reception signals modeled as Equation 5, a reception signal which is received through the $s^{th}$ subcarrier is specified as follows.

$$Y(s) = H(s)X(s) + N(s) \quad \text{Equation 10}$$

$$\begin{bmatrix} Y_1(s) \\ \vdots \\ Y_{Nr}(s) \end{bmatrix} = \begin{bmatrix} H_{11}(s) & \cdots & H_{1N_u}(s) \\ \vdots & \ddots & \vdots \\ H_{Nr1}(s) & \cdots & H_{NrNu}(s) \end{bmatrix} \begin{bmatrix} X_1(s) \\ \vdots \\ X_{Nu}(s) \end{bmatrix} + \begin{bmatrix} N_1(s) \\ \vdots \\ N_{Nr}(s) \end{bmatrix}$$

where, $s \in \{1, \ldots, N_s\}$ $$X_u(s) = \frac{1}{\sqrt{N_S}} D_F(s) \cdot S_u$$

$D_F(s)$ denote a $s^{th}$ row vector of the matrix $D_F$.

Similar to Equation 9, if the channel response and the DFT matrix are combined to one in Equation 10, the following equation is obtained.

$$Y(s) = \hat{H}(s)S + N(s) \quad \text{Equation 11}$$

$$\begin{bmatrix} Y_1(s) \\ \vdots \\ Y_{Nr}(s) \end{bmatrix} = \begin{bmatrix} \hat{H}_{11}(s) & \cdots & \hat{H}_{1Nu}(s) \\ \vdots & \ddots & \vdots \\ \hat{H}_{Nr1}(s) & \cdots & \hat{H}_{NrNu}(s) \end{bmatrix} \begin{bmatrix} S_1 \\ \vdots \\ S_{N_u} \end{bmatrix} + \begin{bmatrix} N_1(s) \\ \vdots \\ N_{Nr}(s) \end{bmatrix}$$

where, $s \in \{1, \ldots, N_s\}$ $$\hat{H}_{ru}(s) = \frac{1}{\sqrt{N_s}} H_{ru}(s) D_F(s)$$

The reception signals expressed by Equation 10 and Equation 11 can be detected by the linear detection method as follow.

$$[First step] for s = 1: N_s, \tilde{X}(s) = W(s)Y(s) \quad \text{Equation 12}$$

$$[Second step] \tilde{S}_u = D_I \tilde{X}_u$$

where, $$\begin{cases} ZF: & W(s) = H^{-1}(s) \\ MMSE: & W(s) = (H(s)H^H(s) + \sigma^2 I)^{-1} H^H(s) \end{cases}$$

$$\tilde{X}_u = \begin{bmatrix} \tilde{X}_u(1) \\ \vdots \\ \tilde{X}_u(N_s) \end{bmatrix}$$

In the virtual MIMO method using spreading in the MIMO-OFDM, since the dimension of the signals to be detected is increased by the number $N_s$ of DFT-spread signals as well as the number $N_u$ of users, it is difficult to detect the signals using the ML method shown in FIG. 4.

Accordingly, in the embodiment of the invention, in order to prevent the dimension of the signals from being increased due to the DFT spreading, in the case of a frequency band signal having a high correlation degree, a method for performing despreading so as to decrease the dimension of the signals and then detecting the signals is suggested. In addition, the signals are preferably spread in a coherence bandwidth, and the size of the DFT spreading band which is determined in consideration of the coherence bandwidth may be determined by the base station and may be informed to the UEs. This embodiment will now be described in detail.

Figure 5:
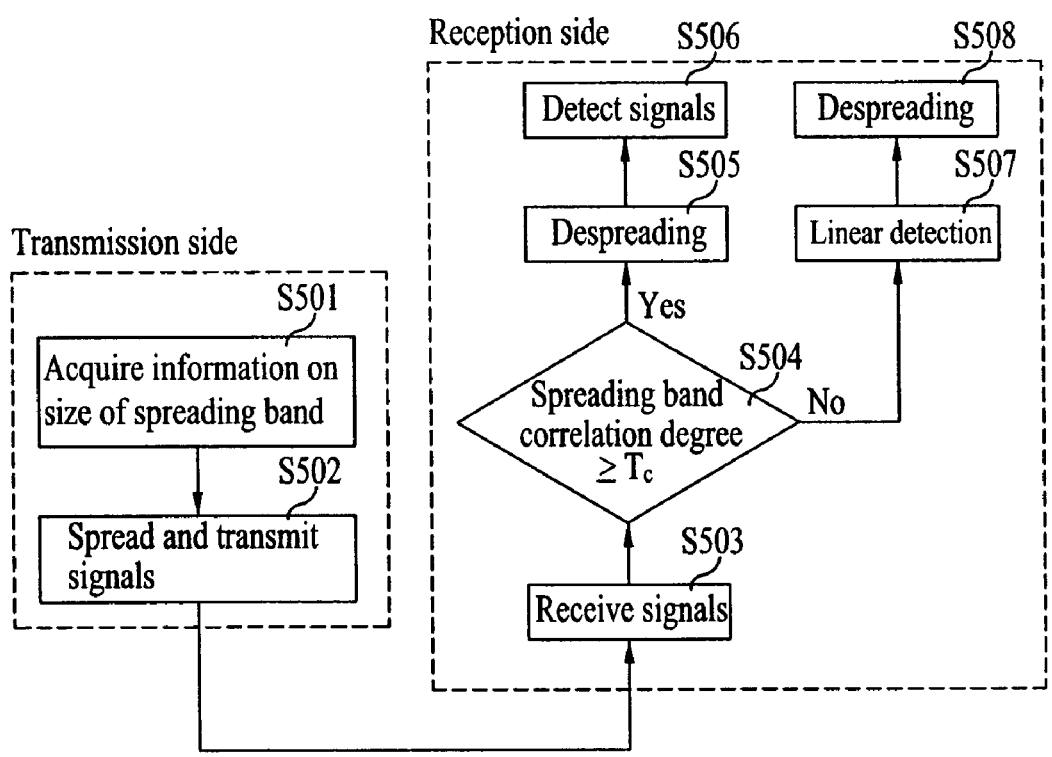
FIG. 5 is a flowchart illustrating a method for transmitting and detecting signals according to an embodiment of the present invention.

FIG. 5 is a flowchart illustrating a method for transmitting and detecting signals according to an embodiment of the present invention.

In this embodiment of the present invention, the transmission side may be the UE or the base station and the reception side may be the base station or the UE. That is, the present embodiment may relate to uplink transmission from the UE to the base station or downlink transmission from the base station to the UE. In the following description, for convenience of description, for example, the uplink transmission in which the transmission side is the UE and the reception side is the base station will be described.

First, in a step S501, the transmission side (for example, the UE) acquires information on the size of at least one spreading band. The information on the size of the spreading band may be determined by the reception side (for example, the base station) in consideration of the correlation degree according to the frequency bands. The spreading band is preferably within the coherence bandwidth as described below. After acquiring the information on the spreading band, the transmission side spreads and transmits signals in a step S502.

The transmitted signals are received by the reception side in a step S503 and it is determined whether the correlation degrees of the bands in which the reception signals are spread are equal to or greater than a predetermined threshold Tc in a step S504.

Among the reception signals, the signals which are spread in the frequency band having a correlation degree of a predetermined level or more as the spreading band are despread in a step S505 and the signals are detected in a step S506. In the signals which are spread in the frequency band having the correlation degree of the predetermined level or more, channels experienced by the signals in the band are similar to each other. Accordingly, if the reception signals are despread, the order of the reception signals is decreased like the reception signals which are transmitted without spreading. Therefore, in the signal detection of the step S506, the signal can be detected by the ML detection method. That is, in the present embodiment, the "predetermined level", which determines whether the frequency correlation degree is high or low, indicates a level in which the signals before spreading can be acquired at the time of despreading the reception signals because the channels experienced by the reception signals in the band in which the signals are spread are similar to each other, and is preferably determined in consideration of the coherence band as described below.

Meanwhile, among the reception signals, as the determined result of the step S504, in the signals which are spread in the frequency band having the correlation degree less than the predetermined level as the spreading band, the signal detection is performed according to the linear detection method in a step S507 and the signal is despread in a step S508. That is, among the reception signals, for the signals which are spread in the frequency band having the correlation degree less than the predetermined level as the spreading band, since the channel responses are different from each other in the spreading band, it is difficult to easily acquire the original signals before spreading through the despreading. It is unlike the signals which are spread in the band having the correlation degree equal to or greater than the predetermined level. Accordingly, it is preferable to detect these reception signals by the linear detection method.

According to the present embodiment, in general, the "coherence bandwidth" indicates a frequency range in which the channel is considered to be flat, that is, a maximum bandwidth or frequency separation in which two frequency signals are subjected to correlated amplitude fading. That is, in the present embodiment, when the transmission signals are spread by the DFT size within the coherence bandwidth, the reception side can easily perform the IDFT at the time of the signal detection. Since the reception signals become equal to the non-spread signals by the despreading, the dimension of the reception signals can be decreased.

Hereinafter, a process of performing the signal detection with respect to the signals which are spread in the band having a high channel correlation degree in the above-described embodiment will be described in more detail.

If the channel correlation degree between subcarriers is high, the channel response in the coherence bandwidth can be expressed as follows.

$$\hat{H} = \begin{bmatrix} \hat{H}_{11} & \cdots & \hat{H}_{1N_u} \\ \vdots & \ddots & \vdots \\ \hat{H}_{N_r1} & \cdots & \hat{H}_{N_rN_u} \end{bmatrix}, \hat{H}_{ru} = H_{ru}D_F, H_{ru} = H_{ru}I_{N_s \times N_s}$$

Equation 13

That is, $\hat{H}_{ru}$ denotes the DFT-spread channel responses in the case of using $N_r$ reception antennas and $N_u$ transmission signals. In the coherence bandwidth having the high channel correlation degree, the channel responses can be equally treated and represented in $N_s$ spreading areas.

On such assumption, a process of despreading the reception signals through the IDFT can be expressed as follows.

$$Y_{eff} = \hat{D}_I Y =$$

$$\hat{D}_I(\hat{H}S + N) = \begin{bmatrix} H_{11}I_{N_s \times N_s} & \cdots & H_{1N_u}I_{N_s \times N_s} \\ \vdots & \ddots & \vdots \\ H_{N_r1}I_{N_s \times N_s} & \cdots & H_{N_rN_u}I_{N_s \times N_s} \end{bmatrix} S + \hat{N}$$

where $$D = D_I I_{(N_s \times N_s) \times (N_s \times N_r)}$$

Equation 14

That is, in the reception signals which are spread in the coherence bandwidth having the high channel correlation degree, the channel responses in the band can be treated as constants regardless of the subcarriers in the spreading band. Accordingly, the original signals before spreading can be easily acquired through the despreading and the dimension of the signals to be detected can be decreased.

The despread reception signals can be simply expressed as follows.

$$Y_{eff}(s) = HS(s) + \hat{N}(s)$$

Equation 15

$$Y_{eff}(s) = \begin{bmatrix} Y_{eff1}(s) \\ \vdots \\ Y_{effN_r}(s) \end{bmatrix}, H = \begin{bmatrix} H_{11} & \cdots & H_{1N_u} \\ \vdots & \ddots & \vdots \\ H_{N_r1} & \cdots & H_{N_rN_u} \end{bmatrix}$$

Accordingly, with respect to the reception signals expressed by Equation 15, the signals can be detected by the non-linear detection method such as the ML method as well as the linear detection method such as the ZF method or the MMSE method, regardless of the detection method.

Hereinafter, various applications of the method according to the embodiment of the present invention will be described.

In the above-described embodiment of the present invention, at least one spreading band is determined in consideration of the coherence band, and the reception side detects the signals after despreading if the correlation degree of the spreading band is equal to or greater than the predetermined level. Thus, the detection dimension of the reception signals can be decreased. At this time, the size of the at least one spreading band which is determined in consideration of the correlation degree according to the frequency bands may be determined by any one of the transmission side and the reception side and may be transmitted to the other, and may be preferably determined by the base station and may be informed to the UEs. Such information may be transmitted through a common control channel, an L1/L2 channel or a fast feedback channel.

Another embodiment of the present invention will be described in association with a process of allocating subcarrier resources to the transmission side, for example, the UEs, by the reception side, for example, the base station.

Figure 6:
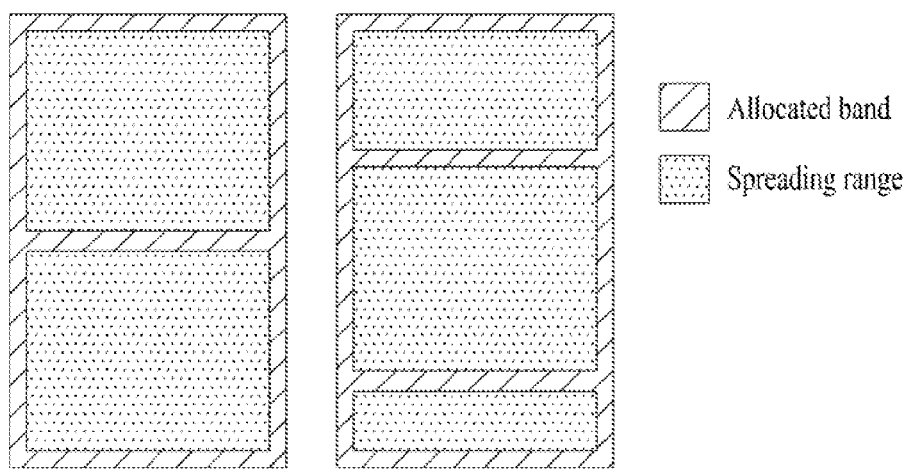
FIG. 6 is a view illustrating a relationship between a subcarrier area and a spreading band allocated according to the embodiment of the invention.

FIG. 6 is a view illustrating a relationship between a subcarrier area and a spreading band allocated according to this embodiment of the invention.

In this embodiment of the present invention, the base station may allocate the subcarrier resources to the UEs in consideration of the channel correlation degree. For example, subcarriers having a high channel correlation degree may be bound and allocated to a specific UE. In this case, the UE spreads and transmits the signals in the allocated subcarrier area, thereby obtaining the above-described effects. Meanwhile, in another embodiment of the present invention, the base station may allocate the subcarrier resources to the UEs regardless of the channel correlation degree. In this case, the spreading band is set in the band having the high channel correlation degree within the allocated subcarrier area, thereby obtaining the above-described effects.

That is, in the embodiment of the present invention, as shown in FIG. 6, various spreading bands having various sizes may exist in the subcarrier bands allocated to the UEs.

In this embodiment of the present invention, the reception side may apply different detection methods or the same detection method to the reception signals, which are spread in the band having the high channel correlation degree, and the reception signals, which are spread in the band having the low channel correlation degree. For example, both the ML method and the linear detection method may be applied to the reception signals which are spread in the band having the high correlation degree, after despreading as described above. In the reception signals which are spread in the band having the low correlation degree, and more particularly, in the reception signals of the system using the virtual MIMO, as described above, since the number of subcarriers in the spreading band as well as the number of users is considered in the ML detection, it is difficult to perform the ML detection. Thus, it is preferable that the linear detection method is applied. That is, in the present embodiment, the reception side may detect all the reception signals by the linear detection method or may detect the reception signals by the different detection methods, that is, may detect the reception signals, which are spread in the band having the high correlation degree, by the ML detection method and detect the reception signals, which are spread in the band having the low correlation degree, by the linear detection method.

Meanwhile, in a case where the antennas have different frequency correlation degrees in the MIMO communication system, one embodiment of the present invention may be applied as follows.

Figure 7:
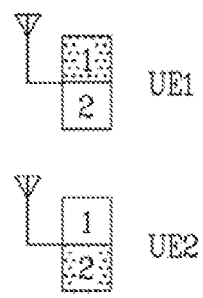
FIG. 7 is a view illustrating a method for transmitting signals using only an antenna having a band with a high correlation degree in a case where, in a transmission side using two antennas, the antennas have different frequency correlation degrees.

FIG. 7 is a view illustrating a method for transmitting signals using only an antenna having a band with a high correlation degree in a case where, in the transmission side using two antennas, the antennas have different frequency correlation degrees.

In general, when the signals may be transmitted using multiple antennas, precoding may be used. In this case, the base station uses a precoded channel when the base station determines the channels of the UEs.

For example, as shown in FIG. 7, when the signals are received from two UEs having the two antennas, if the channels of an antenna 1 of the UE1 and an antenna 2 of the UE2 have the high frequency correlation degrees, only the antennas having the high channel correlation degrees among the antennas of the UEs transmit the signals and the base station receives the signals from the two UEs using a codebook having a rank of 1, thereby realizing the virtual MIMO.

In this case, the UEs may perform precoding and transmit the signals after SC-FDMA and the base station uses channels changed by applying the code book to the estimated channels when an uplink channel status is measured.

Meanwhile, in the preferred embodiment of the present invention, the size of the spreading band may be determined in consideration of transmission power.

In more detail, since the SC-FDMA scheme and the OFDMA scheme used in the communication system are equal to each other except for the DFT spreading, a case where the size of the spreading band is set to 1 in the SC-FDMA may be considered to the OFDMA scheme. Accordingly, the communication system according to the embodiment of the present invention may use any one of the SC-FDMA scheme and the OFDMA scheme. The case where the communication system uses the OFDMA method may be considered to the case where the size of the spreading band determined according to the above-described method is determined by one subcarrier band. Information on the communication scheme used in the communication system may be transmitted from the reception side to the transmission side.

In more detail, the information on the communication method used in the communication system may be variably applied according to the antenna method.

For example, if both the SISO system and the MIMO system support the SC-FDMA scheme and the OFDMA scheme, information indicating which mode is used in the SISO system and which mode is used in the MIMO system may be signaled. In contrast, if the SISO system supports one of the SC-FDMA and the OFDMA schemes and the MIMO system supports both the two schemes, information for checking the SC-FDMA scheme and the OFDMA scheme may be signaled when the SISO system is changed to the MIMO system. If the SISO system supports both the two schemes and the MIMO system supports any one of the SC-FDMA scheme and the OFDMA scheme, information for checking the SC-FDMA scheme and the OFDMA scheme may be signaled when the MIMO system is changed to the SISO system. The communication scheme used may vary according to the base station. For example, in the virtual MIMO system, some base station may use the SC-FDMA scheme and some base station may use the OFDMA scheme.

As described above, the information on the communication scheme used in the communication system may be signaled together with or independent of information on at least one spreading band in the embodiment of the present invention. For example, the base station may inform the UEs of the information on the supported communication scheme and/or the information on the size of the spreading band when the system is started or may inform the UEs of the information on the supported communication scheme and/or the information on the size of the spreading band through system parameters periodically or whenever the information is changed. Such information may be transmitted through L1/L2 signaling.

As described above, the communication scheme used may be determined according to the capability of the base station. That is, the detection method and communication scheme used can be determined according to an MIMO receiver (for example, a receiver using an ML method, an MMSE method and MMSE-SIC method) supported by the base station.

The above-described communication scheme may be determined according to a modulation scheme. For example, if the modulation scheme used when the SC-FDMA scheme is switched to the OFDMA scheme is quadrature phase shift keying (QPSK), loss of 2.4 dB may occur in a channel quality value and, if the modulation scheme is 16 quadrature amplitude modulation (16-QAM), loss of 1.3 dB may occur. In addition, in the case where the detection method is changed from the MMSE method to the ML method, if the QPSK is used as the modulation scheme, a channel quality gain of 2 dB may occur and, if the 16-QAM is used as the modulation scheme, a gain of 4 dB may occur. Accordingly, in the embodiment of the present invention, the communication scheme and the method for detecting the reception signals may be selected according to the modulation scheme used in the system in consideration of the above description.

In another embodiment of the present invention, in opposition to the above description, the level of the modulation and coding scheme (MCS) may be determined in consideration of the detection method used in the reception side. That is, a channel quality indicator (CQI) value computed may vary according to whether the detection method is the ML method or the MMSE method. If the detection method of the reception side is the ML detection method in a range in which the signals are spread by the transmission side, the transmission side computes and transmits the CQI according to the ML.

Meanwhile, in the SC-FDMA scheme, as the size of the spreading band is decreased, the PAPR is increased. Accordingly, the size of the spreading band may be also determined in consideration of a power level determined by power control and a maximum allowance power range of a power amplifier. For example, in the embodiment of the present invention, if the maximum allowance power of the power amplifier is 20 mW and average power allocated to the UEs is 10 mW, the size of the spreading band determined according to the correlation degree of the frequency band may be determined in a range of satisfying the average power of 10 mW and the maximum allowance power of 20 mW.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for detecting signals at a reception side in a communication system, the method comprising:
   receiving the signals that are spread according to a size of at least one spreading band;
   determining whether a correlation degree of the at least one spreading band is equal to or greater than a predetermined level; and
   performing a procedure for detecting the received signals based on the determination, wherein the procedure for detecting the received signals comprises:
      despreading the received signals prior to detecting the received signals when the correlation degree of the at least one spreading band is equal to or greater than the predetermined level, and
      detecting the received signals prior to despreading the received signals when the correlation degree of the spreading band is less than the predetermined level.

2. The method according to claim 1, wherein detecting the despread signals comprises detecting the despread signals by a maximum likelihood (ML) detection method after despreading the received signals.

3. The method according to claim 1, wherein detecting the received signals comprises detecting the received signals by a linear detection method before despreading the detected signals.

4. The method according to claim 1, further comprising:
   determining the size of the at least one spreading band at the reception side based on a size of a coherence bandwidth for each frequency band, and
   transmitting information related to the size of the at least one spreading band to a transmission side before receiving the signals.

5. The method according to claim 4, wherein determining the size of the at least one spreading band is further determined based on at least a maximum allowed power of a power amplifier or an average power allocated to the transmission side.

6. The method according to any one of claims 1 to 5, wherein:
   the communication system is configured to utilize a single carrier frequency division multiple access (SC-FDMA) scheme or an orthogonal frequency division multiple access (OFDMA) scheme, and
   the size of the at least one spreading band is determined and used by one subcarrier band when the communication system uses the OFDMA scheme.

7. The method according to claim 6, further comprising transmitting information related to a communication scheme to a transmission side used in the communication system.

8. A method for transmitting signals at a transmission side in a communication system, the method comprising:
   acquiring information related to a size of at least one spreading band, the size is determined based on a correlation degree of a frequency band;
   determining a level of modulation and coding scheme (MCS) according to a detection method;
   spreading transmission signals according to the size of the at least one spreading band, and
   transmitting the spread signals,
   wherein the transmitted signals include information related to the level of the MCS.

9. The method according to claim 8, wherein the size of the at least one spreading band is determined at a reception side based on a size of a coherence bandwidth of the frequency band.

10. The method according to claim 8, further comprising receiving the information from a reception side that is related to either the size of the at least one spreading band or the detection method used at the reception side.

* * * * *